United States Patent
Suzuki et al.

(10) Patent No.: US 12,244,775 B2
(45) Date of Patent: Mar. 4, 2025

(54) SOUND DIAGNOSIS SYSTEM, INFORMATION PROCESSING APPARATUS, AND COMPUTER-READABLE STORAGE MEDIUM

(71) Applicant: CANON KABUSHIKI KAISHA, Tokyo (JP)

(72) Inventors: Yohei Suzuki, Shizuoka (JP); Seiji Hara, Shizuoka (JP); Hiroshi Hagiwara, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/181,681

(22) Filed: Mar. 10, 2023

(65) Prior Publication Data
US 2023/0300258 A1 Sep. 21, 2023

(30) Foreign Application Priority Data
Mar. 17, 2022 (JP) .................. 2022-042776

(51) Int. Cl.
*G03G 15/00* (2006.01)
*H04N 1/00* (2006.01)

(52) U.S. Cl.
CPC ......... *H04N 1/00055* (2013.01); *G03G 15/50* (2013.01); *G03G 15/55* (2013.01); *G03G 2215/00637* (2013.01)

(58) Field of Classification Search
CPC ........ G06F 3/121; G06F 3/1229; G03G 15/55
See application file for complete search history.

(56) References Cited

U.S. PATENT DOCUMENTS

| | | | |
|---|---|---|---|
| 10,120,321 B2 | 11/2018 | Mori | |
| 11,514,283 B2 | 11/2022 | Suzuki | |
| 2007/0070456 A1* | 3/2007 | Nishimura | H04N 1/00037 358/504 |
| 2009/0097870 A1* | 4/2009 | Misumi | G03G 15/5079 399/36 |
| 2016/0211934 A1* | 7/2016 | Lee | H04N 21/25891 |
| 2023/0350614 A1* | 11/2023 | Suzuki | G06F 3/121 |
| 2023/0393515 A1* | 12/2023 | Hara | G03G 15/5008 |

FOREIGN PATENT DOCUMENTS

| | | |
|---|---|---|
| JP | 2016-014818 A | 1/2016 |
| JP | 2018-200409 A | 12/2018 |
| JP | 2020-170975 A | 10/2020 |

OTHER PUBLICATIONS

Copending U.S. Appl. No. 18/305,835, filed Apr. 24, 2023.
Extended European Search Report, dated Aug. 22, 2023, in European Patent Application No. 20864737.0.

* cited by examiner

*Primary Examiner* — Sevan A Aydin
(74) *Attorney, Agent, or Firm* — Venable LLP

(57) ABSTRACT

A sound diagnosis system includes: a setting unit configured to set a threshold for each of a plurality of time sections, based on a sound wave level in each of the plurality of time sections of a plurality of first sound data classified in a first group; and a determination unit configured to determine whether or not an abnormal sound is generated by calculating a comparison value for each of the plurality of time sections based on a sound wave level in each of the plurality of time sections of one or more second sound data classified in the first group, and comparing the comparison value for each of the plurality of time sections with the threshold value of the corresponding time section of the first group, the threshold value being set by the setting unit.

21 Claims, 13 Drawing Sheets

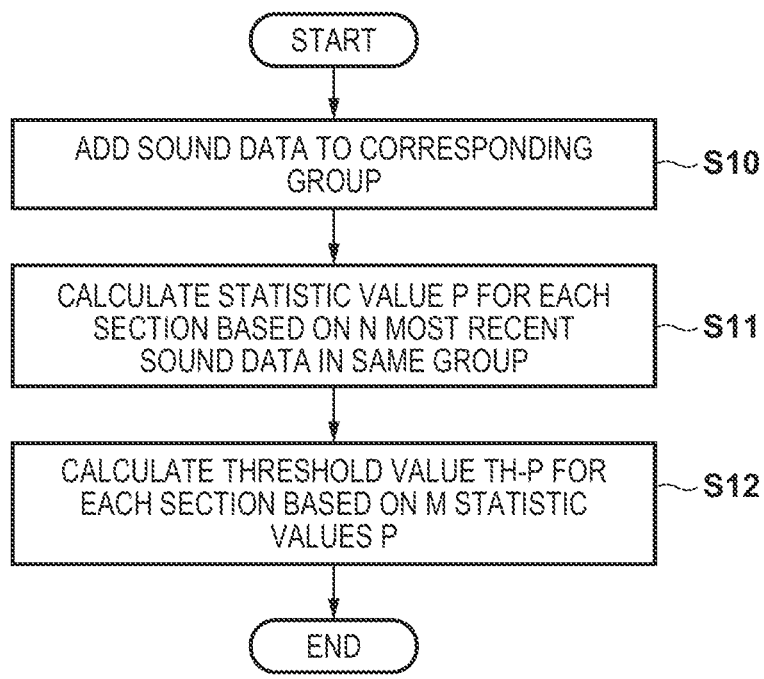

FIG. 6A

| TIME SECTION | #1 | #2 | #3 | #4 | #5 | #6 | #7 | #8 | #9 | #10 | #11 | #12 | #13 | #14 | #15 | #16 |
|---|---|---|---|---|---|---|---|---|---|---|---|---|---|---|---|---|
| SOUND WAVE LEVEL L | 4364 | 3937 | 3905 | 3813 | 3781 | 3784 | 5296 | 3855 | 3616 | 3675 | 3257 | 3252 | 3256 | 3239 | 2940 | 2818 |
| FEEDING MOTOR | 1 | 1 | 1 | 0 | 0 | 0 | 0 | 0 | 0 | 0 | 0 | 0 | 0 | 0 | 0 | 0 |
| INTERMEDIATE TRANSFER MEMBER MOTOR | 1 | 1 | 1 | 1 | 1 | 1 | 1 | 1 | 1 | 1 | 1 | 1 | 1 | 1 | 0 | 0 |
| PHOTOCONDUCTOR MOTOR | 1 | 1 | 1 | 1 | 1 | 1 | 1 | 1 | 1 | 1 | 1 | 1 | 0 | 0 | 0 | 0 |
| DEVELOPING MOTOR | 1 | 1 | 1 | 1 | 1 | 1 | 1 | 1 | 1 | 1 | 1 | 1 | 0 | 0 | 0 | 0 |
| FIXING MOTOR | 1 | 1 | 1 | 0 | 0 | 0 | 1 | 1 | 0 | 0 | 0 | 0 | 0 | 0 | 0 | 0 |
| SOLENOID | 0 | 0 | 0 | 0 | 0 | 0 | 1 | 1 | 0 | 0 | 0 | 0 | 0 | 0 | 0 | 0 |

FIG. 6B

| TIME SECTION | #1 | #2 | #3 | #4 | #5 | #6 | #7 | #8 | #9 | #10 | #11 | #12 | #13 | #14 | #15 | #16 |
|---|---|---|---|---|---|---|---|---|---|---|---|---|---|---|---|---|
| SOUND WAVE LEVEL L | 3977 | 3933 | 3895 | 3951 | 3781 | 3784 | 3854 | 5230 | 3873 | 3655 | 3453 | 3289 | 3295 | 2955 | 2984 | 2911 |
| FEEDING MOTOR | 1 | 1 | 1 | 0 | 0 | 0 | 0 | 0 | 0 | 0 | 0 | 0 | 0 | 0 | 0 | 0 |
| INTERMEDIATE TRANSFER MEMBER MOTOR | 1 | 1 | 1 | 1 | 1 | 1 | 1 | 1 | 1 | 1 | 1 | 1 | 1 | 0 | 0 | 0 |
| PHOTOCONDUCTOR MOTOR | 1 | 1 | 1 | 1 | 1 | 1 | 1 | 1 | 1 | 1 | 1 | 1 | 1 | 0 | 0 | 0 |
| DEVELOPING MOTOR | 1 | 1 | 1 | 1 | 1 | 1 | 1 | 1 | 1 | 1 | 1 | 0 | 0 | 0 | 0 | 0 |
| FIXING MOTOR | 1 | 1 | 1 | 0 | 0 | 0 | 0 | 1 | 1 | 0 | 0 | 0 | 0 | 0 | 0 | 0 |
| SOLENOID | 0 | 0 | 0 | 0 | 0 | 0 | 0 | 1 | 1 | 0 | 0 | 0 | 0 | 0 | 0 | 0 |

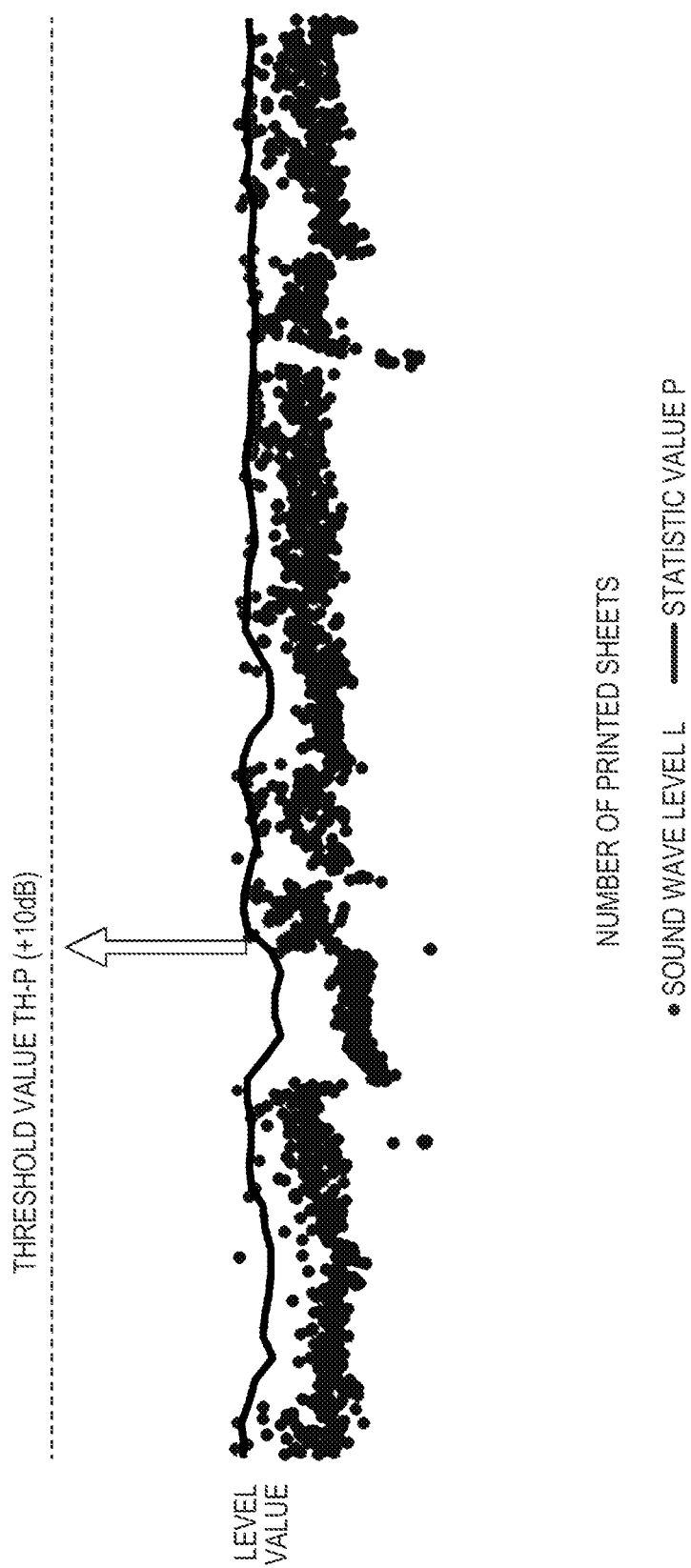

FIG. 10

| TIME SECTION | #1 | #2 | #3 | #4 | #5 | #6 | #7 | #8 | #9 | #10 | #11 | #12 | #13 | #14 | #15 | #16 |
|---|---|---|---|---|---|---|---|---|---|---|---|---|---|---|---|---|
| COMPARISON RESULT | NG | NG | NG | NG | NG | NG | NG | NG | OK | OK | OK | OK | OK | OK | OK | OK |
| FEEDING MOTOR | 1 | 1 | 1 | 0 | 0 | 0 | 0 | 0 | 0 | 0 | 0 | 0 | 0 | 0 | 0 | 0 |
| INTERMEDIATE TRANSFER MEMBER MOTOR | 1 | 1 | 1 | 1 | 1 | 1 | 1 | 1 | 1 | 1 | 1 | 1 | 1 | 1 | 0 | 0 |
| PHOTOCONDUCTOR MOTOR | 1 | 1 | 1 | 1 | 1 | 1 | 1 | 1 | 1 | 1 | 1 | 1 | 0 | 0 | 0 | 0 |
| DEVELOPING MOTOR | 1 | 1 | 1 | 1 | 1 | 1 | 1 | 1 | 1 | 1 | 0 | 1 | 1 | 0 | 0 | 0 |
| FIXING MOTOR | 1 | 1 | 1 | 1 | 1 | 1 | 1 | 1 | 0 | 0 | 0 | 0 | 0 | 0 | 0 | 0 |
| SOLENOID | 0 | 0 | 0 | 0 | 0 | 0 | 1 | 1 | 0 | 0 | 0 | 0 | 0 | 0 | 0 | 0 |
| RELATED REPLACEMENT UNIT | — | EACH ROLLER OF FEEDING UNIT | | | | — | INTERMEDIATE TRANSFER MEMBER | | INTERMEDIATE TRANSFER MEMBER | FIXING UNIT | | CARTRIDGE | | | INTERMEDIATE TRANSFER MEMBER | — |

FIG. 12

| TIME SECTION | #1 | #2 | #3 | #4 | #5 | #6 | #7 | #8 | #9 | #10 | #11 | #12 | #13 | #14 | #15 | #16 |
|---|---|---|---|---|---|---|---|---|---|---|---|---|---|---|---|---|
| SOUND WAVE LEVEL L | 4364 | 3937 | 3905 | 3813 | 3781 | 3784 | 5296 | 3855 | 3616 | 3675 | 3257 | 3252 | 3256 | 3239 | 2940 | 2818 |
| FEEDING MOTOR | 1 | 1 | 1 | 0 | 0 | 0 | 0 | 0 | 0 | 0 | 0 | 0 | 0 | 0 | 0 | 0 |
| INTERMEDIATE TRANSFER MEMBER MOTOR | 1 | 1 | 1 | 1 | 1 | 1 | 1 | 1 | 1 | 1 | 1 | 1 | 1 | 1 | 0 | 0 |
| PHOTOCONDUCTOR MOTOR | 1 | 1 | 1 | 1 | 1 | 1 | 1 | 1 | 1 | 1 | 1 | 1 | 1 | 0 | 0 | 0 |
| DEVELOPING MOTOR | 1 | 1 | 1 | 1 | 1 | 1 | 1 | 1 | 1 | 1 | 1 | 1 | 0 | 0 | 0 | 0 |
| FIXING MOTOR | 1 | 1 | 0 | 0 | 0 | 0 | 1 | 1 | 0 | 0 | 0 | 0 | 0 | 0 | 0 | 0 |
| SOLENOID | 0 | 0 | 0 | 0 | 0 | 0 | 1 | 1 | 0 | 0 | 0 | 0 | 0 | 0 | 0 | 0 |

SOUND DIAGNOSIS SYSTEM, INFORMATION PROCESSING APPARATUS, AND COMPUTER-READABLE STORAGE MEDIUM

BACKGROUND OF THE INVENTION

Field of the Invention

The present invention relates to a technique for determining whether or not an abnormal sound is generated during operation of an apparatus.

Description of the Related Art

An image forming apparatus such as a copying machine or a laser printer includes replacement parts (replacement units) to be replaced depending on their lifetime. Using a replacement unit beyond its lifetime may lead to generation of a sound (referred to as abnormal sound in the following) which is different from the sound in normal operation. For example, a feeding unit configured to convey sheets may generate an abnormal sound due to wear of the shaft and bearing of a conveying roller of the feeding unit. Generation of an abnormal sound may be an indicator of an exceeded lifetime of a replacement unit or a sign of occurrence of failure in the replacement unit, or may provide discomfort to the user. It is therefore desirable to determine generation of an abnormal sound and identify a replacement unit generating the abnormal sound.

Japanese Patent Laid-Open No. 2016-14818 discloses a configuration in which a sound collector is provided inside an image forming apparatus and whether or not an abnormal sound is generated is detected by comparing a collected sound with known abnormal sounds and also a part generating the abnormal sound is detected.

The configuration of Japanese Patent Laid-Open No. 2016-14818 is however applicable only to known abnormal sounds.

SUMMARY OF THE INVENTION

According to an aspect of the present invention, a sound diagnosis system includes: a reception unit configured to receive a sound wave in an apparatus including one or more actuators; a generation unit configured to process a signal indicating the sound wave in a predetermined period received by the reception unit, and generate sound data indicating a sound wave level in each of a plurality of time sections and an operation status of the one or more actuators in each of the plurality of time sections, the plurality of time sections being divisions of the predetermined period; a classification unit configured to classify and group the sound data based on a difference of operation status of the one or more actuators in each of the plurality of time sections; a setting unit configured to set a threshold for each of the plurality of time sections, based on a sound wave level in each of the plurality of time sections of a plurality of first sound data classified in a first group; and a determination unit configured to determine whether or not an abnormal sound is generated by calculating a comparison value for each of the plurality of time sections based on a sound wave level in each of the plurality of time sections of one or more second sound data classified in the first group, and comparing the comparison value for each of the plurality of time sections with the threshold value of the corresponding time section of the first group, the threshold value being set by the setting unit.

Further features of the present invention will become apparent from the following description of exemplary embodiments with reference to the attached drawings.

BRIEF DESCRIPTION OF THE DRAWINGS

FIG. 5 is a flowchart of a threshold value setting process according to an embodiment;

FIGS. 6A and 6B are diagrams illustrating a classification result based on an actuator status according to an embodiment;

FIG. 7 is a diagram illustrating a relation between statistic values and threshold values according to an embodiment;

FIG. 10 is an explanatory diagram of a process of determining a replacement unit generating an abnormal sound, according to an embodiment;

FIG. 12 is an explanatory diagram of a threshold value setting process according to an embodiment.

DESCRIPTION OF THE EMBODIMENTS

Figure 1:
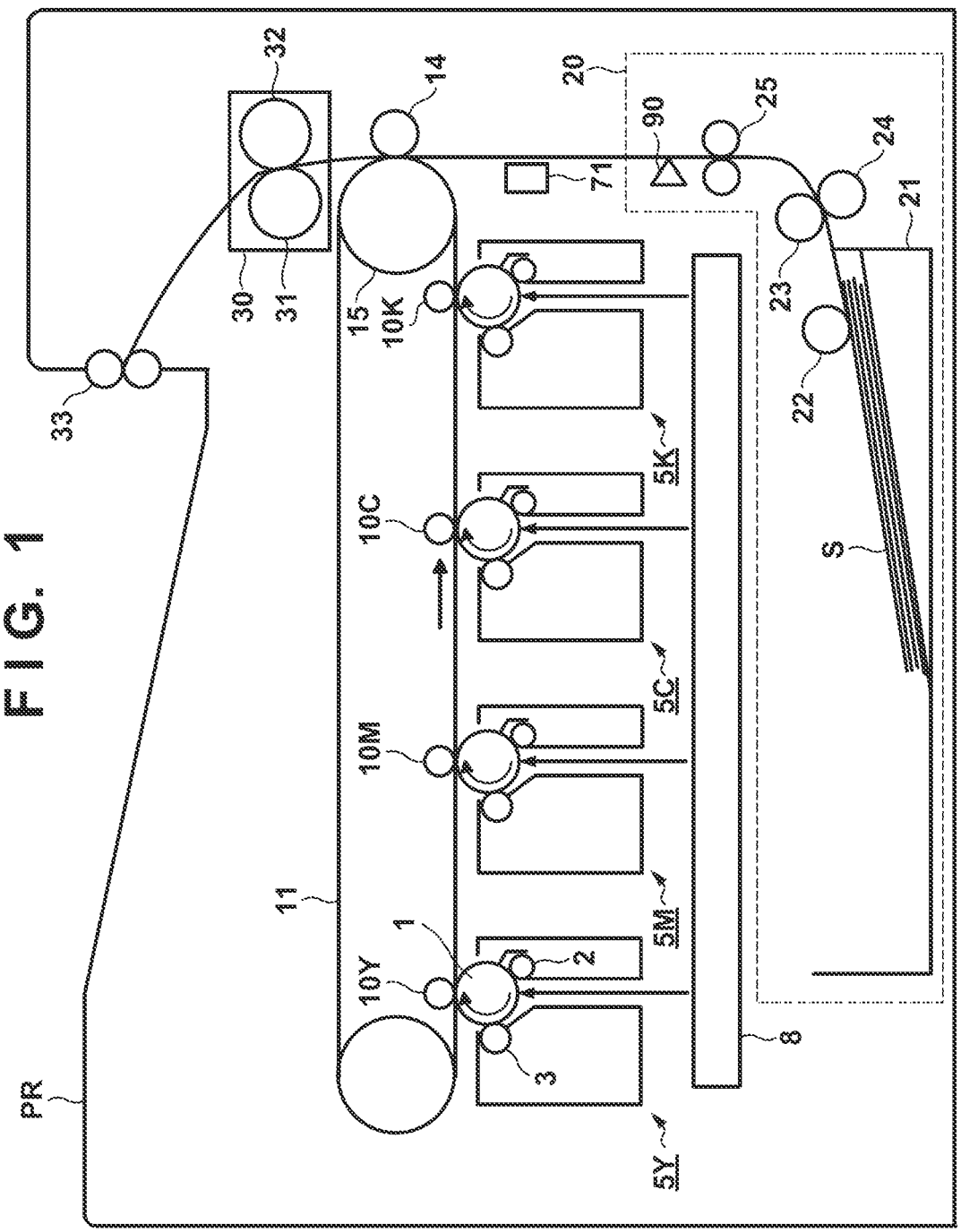
FIG. 1 is a schematic configuration diagram of an image forming apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a schematic configuration diagram of an image forming apparatus PR according to the present embodiment. The image forming apparatus PR includes cartridges 5Y, 5M, 5C and 5K configured to form yellow, magenta, cyan and black toner images on an intermediate transfer member 11. Although the cartridges 5Y, 5M, 5C and 5K contain toner of different colors, the configurations thereof are similar and therefore the cartridges 5Y, 5M, 5C and 5K will be collectively referred to as a cartridge 5 in the following description. The cartridge 5, including a photoconductor 1, a charging roller 2, and a developing roller 3, is configured to be attachable to and detachable from the main body of the image forming apparatus PR. In other words, the cartridge 5 is a replacement unit for the image forming apparatus PR. A photoconductor 1 is rotationally driven in a clockwise direction in the figure in forming an image. The charging roller 2 charges the surface of the photoconductor 1. A scanning unit 8 exposes each of the photoconductors 1 based on image data, and forms an electrostatic latent image on each of the photoconductors 1. The developing roller 3 forms a toner image on the photoconductor 1 by developing the electrostatic latent image on the photoconductor 1 with toner. Primary transfer rollers 10Y, 10M, 10C and 10K respectively transfer, to the intermediate transfer member 11, the toner images on the photoconductors 1 of the cartridges 5Y, 5M, 5C and 5K.

An intermediate transfer member unit includes the intermediate transfer member 11, a plurality of rollers including the driving roller 15 configured to stretch the intermediate transfer member 11, and the primary transfer rollers 10Y, 10M, 10C and 10K. The intermediate transfer member unit is a replacement unit for the image forming apparatus PR. In image formation, the driving roller 15 is rotationally driven in a counterclockwise direction in the drawing by a motor not illustrated. Accordingly, the intermediate transfer member 11 is also rotationally driven in the counterclockwise direction in the drawing. Therefore, the toner image on the intermediate transfer member 11 is conveyed to a position facing a secondary transfer roller 14.

A feeding roller 22 of the feeding unit 20 feeds a printing material S stored in a cassette 21 to a conveyance path of the image forming apparatus PR. A conveying roller 23 conveys the printing material S, fed by the feeding roller 22, to downstream side. A separation roller 24 is provided in order to prevent double feed. A registration roller 25 conveys the printing material S toward the position facing the secondary transfer roller 14. The feeding roller 22, the conveying roller 23, and the registration roller 25 are replacement units for the image forming apparatus PR, respectively. The secondary transfer roller 14 transfers the toner image on the intermediate transfer member 11 to the printing material S. A fixing unit 30, including a fixing film 31 and a pressure roller 32, fixes the toner image on the printing material S by heating and pressing the printing material S. The fixing unit 30 is a replacement unit for the image forming apparatus PR. After the toner image is fixed, the printing material S is discharged to the outside of the image forming apparatus by a discharging roller 33. A conveyance sensor 90, which is provided downstream side of the registration roller 25, detects the printing material S. A reception unit 71 configured to receive sound waves is provided between the conveyance sensor 90 and the secondary transfer roller 14. For example, the reception unit 71 includes a Micro Electro Mechanical System (MEMS) microphone configured to convert vibration displacement of a vibration plate caused by pressure into a voltage change and outputs the voltage change. Here, any microphone other than the MEMS microphone, such as a condenser microphone, may be used as long as it can receive sound waves.

Figure 2:
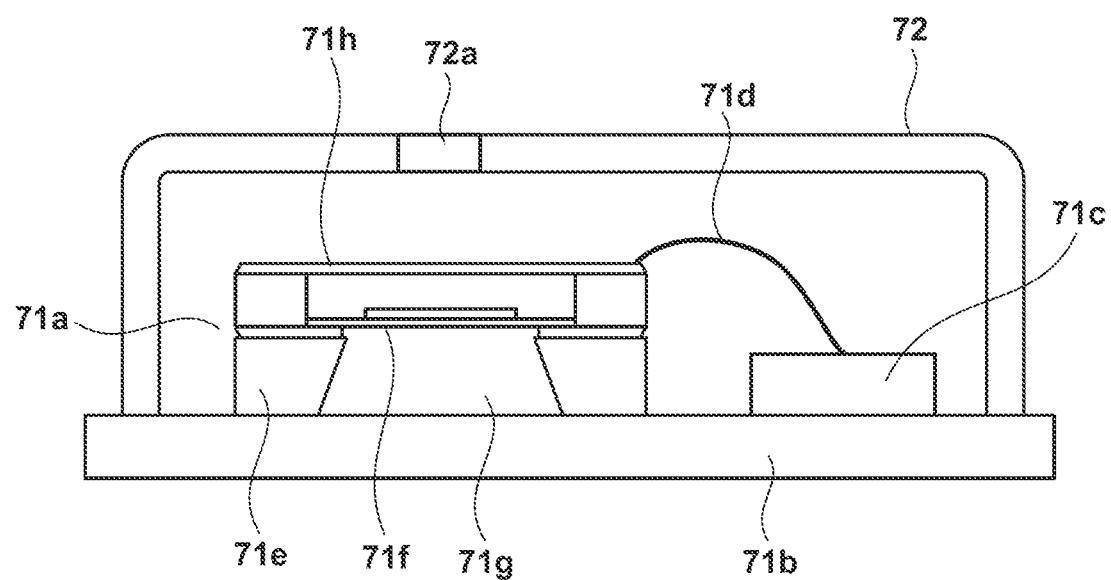
FIG. 2 is a diagram illustrating a configuration of a MEMS microphone of a reception unit according to an embodiment.

FIG. 2 is a cross-sectional view illustrating an example of the MEMS microphone of the reception unit 71. A substrate 71b is provided with a MEMS chip 71a and an amplifying circuit 71c. The MEMS chip 71a and the amplifying circuit 71c are shielded by a shield case 72. The shield case 72 is provided with a sound hole 72a configured to take in sound waves from the outside. The MEMS chip 71a and the amplifying circuit 71c are electrically connected to each other by a wire 71d. The MEMS chip 71a includes a vibration film 71f formed on the silicon substrate 71e and a back electrode 71h provided facing the vibration film 71f and including a large number of sound holes. The vibration film 71f and the back electrode 71h facing each other form a capacitor. The silicon substrate 71e is provided with a cavity portion 71g, and the vibration film 71f is provided to cover the cavity portion 71g. When a sound wave is input from the sound hole 72a provided in the shield case 72, the vibration film 71f vibrates, outputting an electric signal in accordance with the vibration status. More specifically, the back electrode 71h converts the change of the capacitance of the capacitor caused by vibration of the vibration film 71f into an electric signal, the capacitor being formed by the vibration film 71f and the back electrode 71h. The electric signal is subjected to amplification process by the amplifying circuit 71c and taken out of the MEMS microphone.

Figure 3:
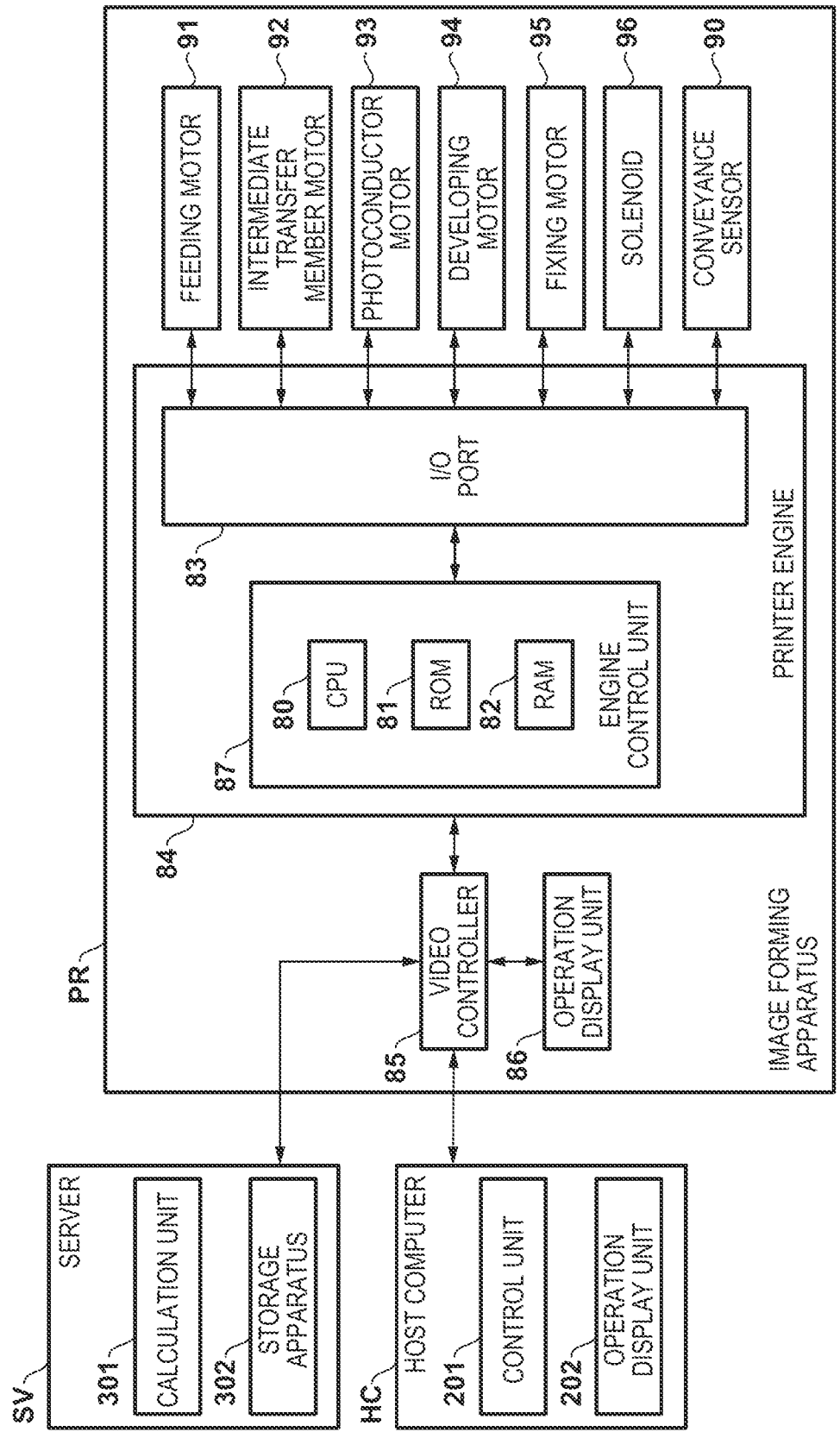
FIG. 3 is a hardware configuration diagram of a sound diagnosis system according to an embodiment.

FIG. 3 is a configuration diagram of a sound diagnosis system, or an image forming system, including the image forming apparatus PR. As illustrated in FIG. 3, a host computer HC, the image forming apparatus PR, and a server SV which is an information processing apparatus are configured to be communicable with each other via a network, for example. A control unit 201 of the host computer HC, including a CPU operating as a processor, performs various processes by executing a control program stored in a storage apparatus which is not illustrated. An operation display unit 202, including a display, a keyboard, a mouse, or the like, provides a user interface. For example, the control unit 201 transmits a print job including image data to the image forming apparatus PR in response to a user operation on the operation display unit 202, and causes the image forming apparatus PR to form an image based on the image data.

A video controller 85 of the image forming apparatus PR performs communication with the host computer HC and the server SV. Upon receiving a print job from the host computer HC, the video controller 85 controls image formation by a printer engine 84 based on the print job. An operation display unit 86, including an operation panel, an operation button, or the like, provides a user interface. The printer engine 84 includes an engine control unit 87 including a CPU 80 that is a processor, a ROM 81, and a RAM 82. The ROM 81 is a non-volatile memory configured to store and hold control programs and various data. Here, a rewritable non-volatile memory may be used in place of the ROM 81. The RAM 82 is a volatile memory configured to store temporary data. The CPU 80 forms an image on the sheet S by executing the control program stored in the ROM 81 to control, via an I/O port 83, respective members illustrated in FIG. 1, as well as motors 91 to 95 and a solenoid 96 illustrated in FIG. 3.

Here, the feeding motor 91 is the driving source of the feeding roller 22, the conveying roller 23, and the registration roller 25. The intermediate transfer member motor 92 is the driving source of the driving roller 15. The photoconductor motor 93 is the driving source of each photoconductor 1. The developing motor 94 is the driving source of each developing roller 3. The fixing motor 95 is the driving source of the pressure roller 32 of the fixing unit 30. The solenoid 96 is the driving source of a mechanical clutch mechanism (not illustrated) configured to separate the primary transfer roller 10 from the intermediate transfer member 11 when image formation is not performed, and bring the primary transfer roller 10 to abut against the intermediate transfer member 11 during image formation.

A calculation unit 301 of the server SV, including one or more processors (CPUs), executes a control program stored in the storage apparatus 302 to perform various processes described below. A storage apparatus 302 includes an arbitrary type of volatile and non-volatile storage devices. The storage apparatus 302 also stores data to be used by the calculation unit 301 in various processes, in addition to the program to be executed by the calculation unit 301. Although the storage apparatus 302 is a component of the server SV in the present embodiment, some or all of the data described below as being stored in the storage apparatus 302 may be stored in an external apparatus that can be accessed from the server SV via a network.

Figure 4:
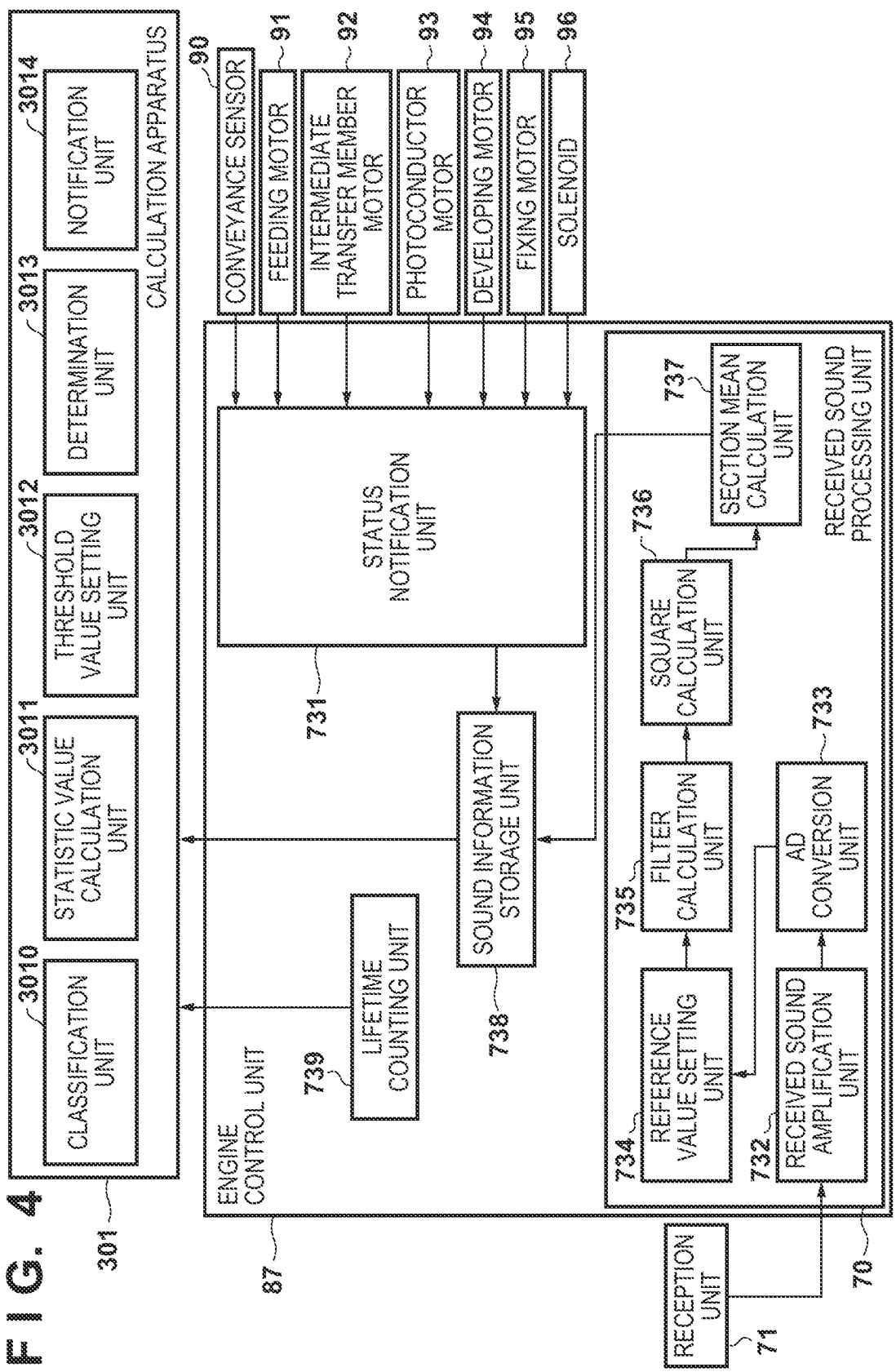
FIG. 4 is a functional block diagram of a sound diagnosis system according to an embodiment.

FIG. 4 is a functional block diagram of the sound diagnosis system illustrated in FIG. 3 according to the present embodiment. The functional blocks illustrated in FIG. 4 may be realized by executing corresponding control programs by the CPU 80 of the engine control unit 87 of the image forming apparatus PR and the CPU of the calculation unit 301 of the server SV, respectively.

Upon receiving a print job, a received sound processing unit 70 performs processing of a sound signal received and output from the reception unit 71 in a predetermined period described below. A received sound amplification unit 732 amplifies the sound signal provided from the reception unit 71. An analog-to-digital (AD) conversion unit 733 converts the sound signal output from the received sound amplification unit 732 into a digital signal (digital value). The sound signal output from the reception unit 71 includes DC components, and therefore a reference value setting unit 734 subtracts a reference value from each value indicated by the digital signal from the AD conversion unit 733, and extracts only the components related to pressure variation of the sound. Here, the reference value is set by the CPU 80.

The filter calculation unit 735 performs a filtering process by applying a filter on the digital signal from the reference value setting unit 734 to which the DC components is removed. Here, the filter calculation unit 735, including a plurality of filters, performs the filtering process using a filter set by the CPU 80. A square calculation unit 736 performs square calculation of digital signals subjected to the filtering process. A section mean calculation unit 737 performs section mean calculation of the digital signals subjected to the square calculation. In the present embodiment, the time section for which the section mean calculation is performed is set to 100 ms, for example. Here, the time length in which the section mean calculation is performed is not limited to the foregoing, and may be different for each measurement. By performing square calculation and section mean calculation, the sound wave level L indicating the degree of sound pressure variation for each time section is obtained. The section mean calculation unit 737 stores a sound wave level L of each time section in a sound information storage unit 738.

At this time, a status notification unit 731 determines the operation status of each of the motors 91 to 95 and the solenoid 96, i.e., whether or not they are operating, and associates the sound wave level L in the time section with the operation status of the respective motors 91 to 95 and the solenoid 96 in the time section. Note that in the following description, the motors 91 to 95 and the solenoid 96 are collectively referred to as an "actuator". The sound information storage unit 738 stores, for each time section, information indicating the operation status of each actuator in the time section and the sound wave level L in the time section. When the operation status of the actuator is changing in the middle of the time section, an operation status with a longer operation time in the time section is used, for example. In the following, information stored in the sound information storage unit 738, which indicates a time section, the operation status of each actuator in the time section, and the sound wave level L in the time section, will be referred to as sound data. Single sound data is a piece of information indicating the operation status of each actuator and the sound wave level L for each of a plurality of successive time sections. Furthermore, single sound data may be associated with print setting information such as the type of filter applied by the filter calculation unit 735, or the type (or basis weight) of the sheet S used for printing. As such, sound data is generated by the image forming apparatus PR in the present embodiment. The sound information storage unit 738 transmits the sound data to the server SV. The server SV stores the sound data acquired from the image forming apparatus PR in the storage apparatus 302.

A lifetime counting unit 739 counts the remaining lifetime of components (replacement units) such as the cartridge 5, the intermediate transfer member unit, each roller conveying a sheet, and the fixing unit 30. For example, a number of printable sheets is set for each replacement unit. The lifetime counting unit 739 determines such that the remaining lifetime is 100% when the number of printed sheets, after the use of the replacement unit is started, is 0, and that the remaining lifetime is 0% when the number of printed sheets, after the use of the replacement unit is started, reaches the number of printable sheets of the replacement unit. The lifetime counting unit 739 notifies the server SV of the remaining lifetime of each replacement unit. The server SV stores, in the storage apparatus 302, the information indicating the remaining lifetime of each replacement unit acquired from the image forming apparatus PR.

Next, a process performed by the server SV will be described. A classification unit 3010 classifies and groups the sound data stored in the storage apparatus 302. The grouping is performed based on the difference of the operation status of respective actuators of a plurality of time sections of single sound data. Specifically, a plurality of sound data having a same operation status of each actuator of a plurality of time sections are grouped in a same group. The grouping may be performed further based on filters applied in generation of the sound data. In this case, for example, even when two sound data have same operation status of each actuator in each of the plurality of time sections, if different filters are applied in generating the two sound data, the two sound data belong to different groups. Furthermore, the grouping may be performed based on print setting information. In this case, for example, even when two sound data have same operation status of each actuator in each of the plurality of time sections, if different types of the sheet S are being conveyed in acquiring the two sound data, the two sound data belong to different groups.

As will be described below, a statistic value calculation unit 3011 calculates, for each group, a statistic value P for each time section based on a plurality of sound data in a same group. As such, the processing described below is performed independently for each group. In the following description, therefore, a process is intended to be independently performed for each group even when the phrase "for each group" is omitted, unless explicitly stated that not "for each group". As will be described below, a threshold value setting unit 3012 sets a threshold value TH-P for each time section, based on the statistic value P for each time section. As will be described below, a determination unit 3013 uses the threshold value TH-P of each time section to determine whether or not an abnormal sound is generated. Furthermore, upon determining that the abnormal sound is generated, the determination unit 3013 determines the replacement unit generating the abnormal sound. A notification unit 3014 notifies the determination result by the determination unit 3013. Here, the notification destination may be a user of the image forming apparatus PR or the host computer HC used by a dealer or the like who performs maintenance and management of the image forming apparatus PR.

In the present embodiment, single sound data is acquired in a period from a timing when the last sheet S of the one or more sheets S to which an image is formed in a single print job has reached a predetermined position to a timing after all the actuators of the image forming apparatus PR stopped. In this example, the timing when the sheet S has reached the predetermined position is assumed to be the timing when the trailing edge of the sheet S has passed through a position at which the conveyance sensor 90 detects the sheet S. In addition, the length of the period in which single sound data is acquired is assumed to be 1600 ms. In this example, the length of a time section is 100 ms, and therefore single sound data is divided into 16 successive time sections, and is data indicating the sound wave level L in each time section and the operation status of each actuator.

The period from the timing when the trailing edge of the last sheet S in a single print job has passed through the conveyance sensor 90 to the timing when all the actuators of the image forming apparatus PR stop includes a period in which the sheet S is not being conveyed in the vicinity of the reception unit 71, which is a period in which the operating sound of each actuator in the image forming apparatus PR can be easily received. In the following description, a period from a timing when the trailing edge of the last sheet S has passed through the conveyance sensor 90 to a timing when all the actuators of the image forming apparatus PR stop is referred to as a "post-rotation period". Here, the period in which the sound data is acquired is not limited to the aforementioned period, and may include, for example, a period after the feeding of the sheet S has started. Furthermore, when there is no need to reduce the processing load of the sound data generation by the image forming apparatus PR or the processing load of the server SV due to an increase of the data amount of sound data, the period from the start of conveyance to the discharge of each sheet S may be set as the acquisition period of single sound data.

FIG. 5 illustrates a process of setting the threshold value TH-P performed by the server SV. Upon acquiring single sound data from the image forming apparatus PR, the classification unit 3010 determines a group to which the sound data belongs at S10, and stores the sound data in the storage apparatus 302 in association with the group to which the sound data belongs. As has been described above, the grouping may be performed based on the difference of the operation status of each actuator in the 16 time sections. Furthermore, the grouping may be performed based on the filter applied, or print setting information. FIGS. 6A and 6B illustrate two sound data classified in different groups based on the operation status of each actuator. Here, "1" of each actuator in the FIGS. 6A and 6B indicates that the actuator is operating (active state) and "0" indicates that the actuator is not operating (an inactive state). The sound data illustrated in FIG. 6A and the sound data illustrated in 6B differ in status of the actuator in the shading part, and thus these sound data are grouped in different groups.

When N sound data are newly added to the group, the statistic value calculation unit 3011 calculates, at S11, a statistic value P for each of the 16 time sections based on the N newest sound data. The statistic value P may be a percentile value of the N sound data, for example. As an example, a 95 percentile value may be set as the statistic value P with N being 100. In this case, letting time sections #1 to time sections #16 be the 16 time sections of single sound data, the value of the fifth highest sound wave level L among the 100 sound wave levels L in the time section #1 is the statistic value P for the time section #1.

When the number of the calculated statistic values P has reached M, the threshold value setting unit 3012 sets, at S12, the threshold value TH-P for each of the 16 time sections based on the M statistic values P. The threshold value TH-P may be a value calculated by adding a predetermined value to the mean of the M statistic values P, for example. For example, M may be set to 100. FIG. 7 illustrates the sound wave level L, the statistic value P calculated from the sound wave level L, and the threshold value TH-P calculated from the statistic value P. In FIG. 7, a value higher than the mean of the M statistic values P by 10 dB is used as the threshold value TH-P. As such, the threshold value TH-P is calculated based on M×N sound wave levels L.

The calculation method of the statistic value P is not limited to the aforementioned method. For example, the statistic value P may be defined as an arbitrary percentile value or the maximum value of the N sound wave levels L. Furthermore, the statistic value P may be defined as the mean of a predetermined number of upper levels of the N sound wave levels L. Similarly, the method of setting the threshold value TH-P is not limited to the aforementioned method. For example, the threshold value TH-P may be a value calculated by increasing the mean or percentile value of the M statistic values P according to a predetermined method.

Figure 8A:
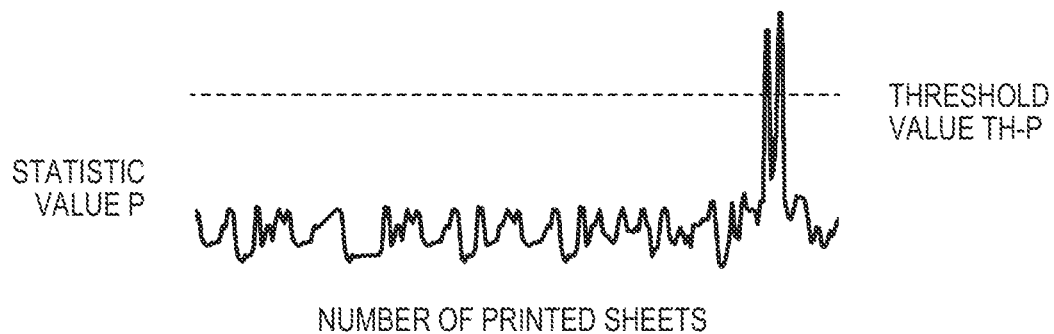
FIGS. 8A to 8C are diagrams illustrating a relation between statistic values and threshold values according to an embodiment.
Figure 8B:
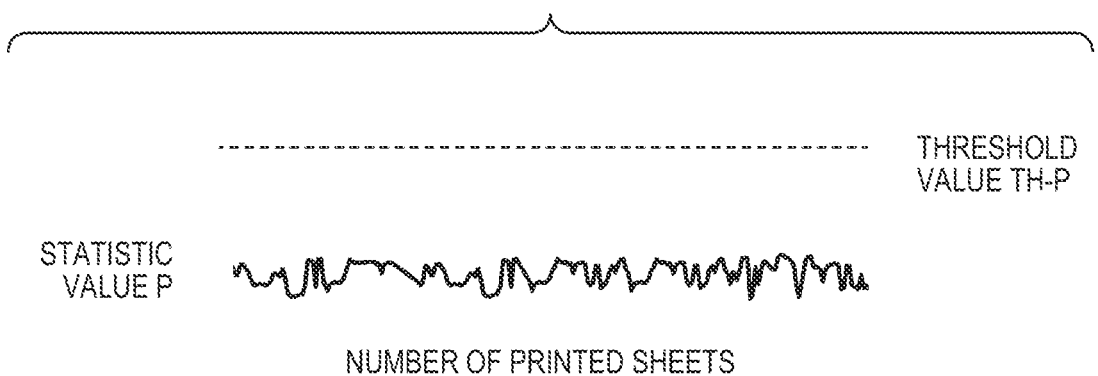
Figure 8C:
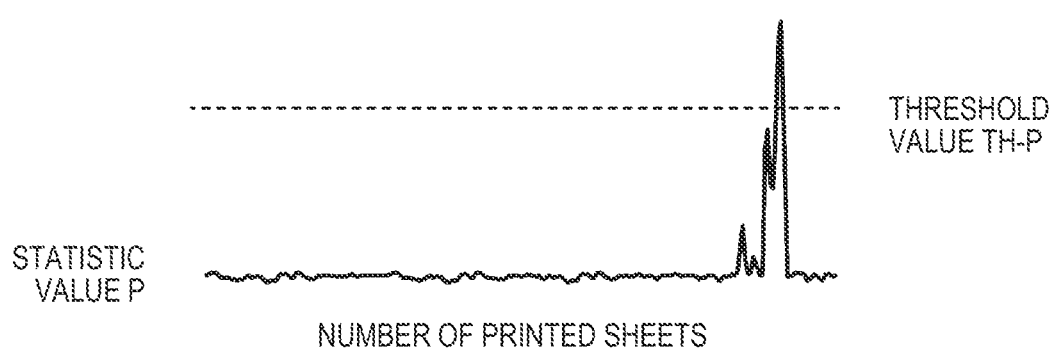

FIGS. 8A to 8C respectively illustrate an example of the threshold value TH-P set for the first time section #1 of the 16 time sections. Here, the groups illustrated in FIGS. 8A to 8C are different from each other. Specifically, FIG. 8A is about a group to which no filter is applied, FIG. 8B is about a group to which a band-pass filter is applied, and the FIG. 8C is about a group to which a high-pass filter is applied.

Figure 9:
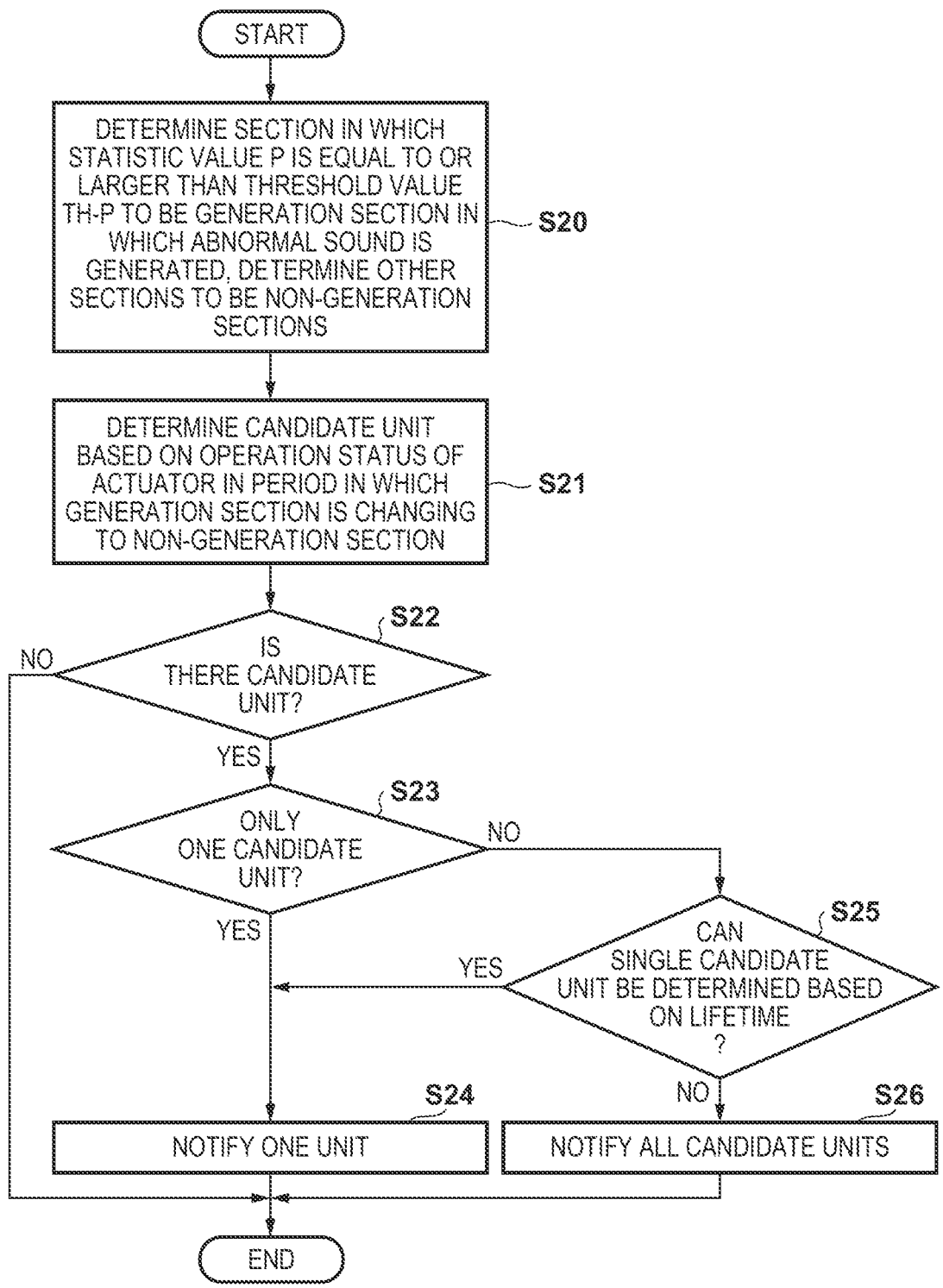
FIG. 9 is a flowchart of a process of determining whether or not an abnormal sound is generated and determining a replacement unit generating the abnormal sound, according to an embodiment.

FIG. 9 is a flowchart of a process of determining whether or not an abnormal sound is generated and determining a replacement unit generating the abnormal sound. The process illustrated in FIG. 9 is executed after the threshold value TH-P is set for each of the 16 time sections. Each time sound data is input from the image forming apparatus PR, the classification unit 3010 groups the sound data, and the statistic value calculation unit 3011 calculates the statistic value P corresponding to each of the 16 time sections each time N sound data are added to the group. The process illustrated in FIG. 9 is executed when the statistic value calculation unit 3011 newly calculates the statistic value P. Here, the statistic value P in the process illustrated in FIG. 9 is based on the sound data acquired by the server SV after the threshold value TH-P is set, and may be referred to as a "comparison value P" when distinguished from the statistic value P used for calculating the threshold value TH-P.

At S20, the determination unit 3013 compares the newly calculated statistic value P for each of the 16 time sections with the threshold value TH-P of the corresponding time section. The determination unit 3013 then determines a section in which the statistic value P is equal to or larger than the threshold value TH-P to be a generation section in which an abnormal sound is generated, and determines the other sections to be non-generation sections in which no abnormal sound is generated. The determination unit 3013 determines, at S21, a replacement unit that may be generating abnormal sound to be a candidate unit, based on the operation status of the actuator in a period in which a generation section is changing to a non-generation section.

For example, assuming that generation sections and non-generation sections are determined as illustrated in FIG. 10. In FIG. 10, "NG" indicates a generation section and "OK" indicates a non-generation section. The result illustrated in FIG. 10 indicates that a generation section is changed to a non-generation section from the time section #8 to the time section #9. The actuator which is in an active state in the time section #8 and has transited to an inactive state in the time section #9 is the solenoid 96. During the post-rotation period, the solenoid 96 operates to separate the primary transfer roller 10 from the intermediate transfer member 11. Therefore, the reason for the abnormal sound not being generated in the time section #9 can be determined that the primary transfer roller 10 is separated from the intermediate transfer member 11. In this case, the intermediate transfer member unit including the primary transfer roller 10 and the intermediate transfer member 11 is determined as a candidate unit. Here, the relation between the actuator and the candidate unit that may be generating the abnormal sound is preliminarily stored in the storage apparatus 302 of the server SV.

At S22, the determination unit 3013 determines whether or not a candidate unit is determined. For example, when it is determined that no abnormal sound is generated in all the time sections, no candidate unit is determined. When no candidate unit is determined, the determination unit 3013 terminates the process illustrated in FIG. 9. When, on the other hand, a candidate unit is determined, the determination unit 3013 determines, at S23, whether or not there is only one candidate unit. For example, the intermediate transfer member unit is the only candidate unit in the example illustrated in FIG. 10. When there is only one candidate unit, the determination unit 3013 causes, at S24, the notification unit 3014 to notify of the generation of the abnormal sound and that one candidate unit is the unit generating the abnormal sound.

When, on the other hand, there are a plurality of candidate units, the determination unit 3013 advances the process to S25. For example, it is assumed in FIG. 10 that it is NG until the time section #3 and changed to OK in the time section #4. In this case, it is the feeding motor 91 that is stopping operation at the time section #4. However, the feeding motor 91 is the driving source of the feeding roller 22, the conveying roller 23, and the registration roller 25, and thus it is impossible to narrow down the units to a single roller. The determination unit 3013 therefore refers to, at S25, the remaining lifetime of each replacement unit received from the lifetime counting unit 739. For example, among the feeding roller 22, the conveying roller 23, and the registration roller 25, when the remaining lifetime of the feeding roller 22 is shorter than a threshold value and the remaining lifetimes of the other rollers are equal to or longer than the threshold value, the determination unit 3013 determines, at S25, that the feeding roller 22 is generating the abnormal sound. As such, upon succeeding in narrowing down the units to a single candidate unit at S25, the determination unit 3013 advances the process to S24. When, on the other hand, failed to narrow down the units to a single candidate unit by referring to the remaining lifetimes, the determination unit 3013 causes, at S26, the notification unit 3014 to notify of the generation of the abnormal sound, and notify of each of a plurality of candidate units that may be generating the abnormal sound. At this time, it may also be configured such that notification is made about, for each of the plurality of candidate units, the remaining lifetime or the probability (degree of likelihood) of generation of the abnormal sound that is calculated based on the remaining lifetime, for example. It may be configured such that notification is made, at S24, only about the fact that an abnormal sound is generated, when at S21 there is no actuator which is in an active state in a generation section and is changed to an inactive state in a non-generation section.

As has been described above, according to the present embodiment, a statistic value P of the sound wave level in each time section is calculated from sound data, and based on the statistic value P, the threshold value TH-P which is larger than the statistic value P is set. And then when a new statistic value P is calculated, it is compared with the threshold value TH-P to determine generation of an abnormal sound. The operation status of the actuators in each time section of a same group is identical, and thus by setting a threshold value based on the sound wave level L when the operation status of the actuators are identical, generation of an abnormal sound can be detected with high precision even when the abnormal sound is an unknown sound. In addition, the replacement unit that is quite possible of generating the abnormal sound can be determined, by determining whether or not an abnormal sound is generated for each time section, and determining the actuator whose operation status has changed at a timing when the generation/non-generation of the abnormal sound has changed.

In the process illustrated in FIG. 9, generation of an abnormal sound is determined by comparing the statistic value (comparison value) P in a time section based on new sound data with the threshold value TH-P for the time section. Here, in the present embodiment, the comparison value P is calculated in a method similar to that for the statistic value P used for calculating the threshold value TH-P. However, the present invention is not limited to calculating the comparison value P in a method similar to that for the statistic value P used for calculating the threshold value TH-P. For example, it is possible to use a different number of sound data, for example, a smaller number of sound data for calculating the comparison value P compared to the number N of sound data used for calculating the statistic value P which is a base for the threshold value TH-P. Furthermore, the comparison value P may be the mean instead of the percentile value of the sound wave levels L of a plurality of sound data. Furthermore, the comparison value P may be the sound wave level L in each time section of single sound data. In this case, the server SV, upon acquiring single sound data from the image forming apparatus PR, executes the process illustrated in FIG. 9.

Second Embodiment

Figure 11:
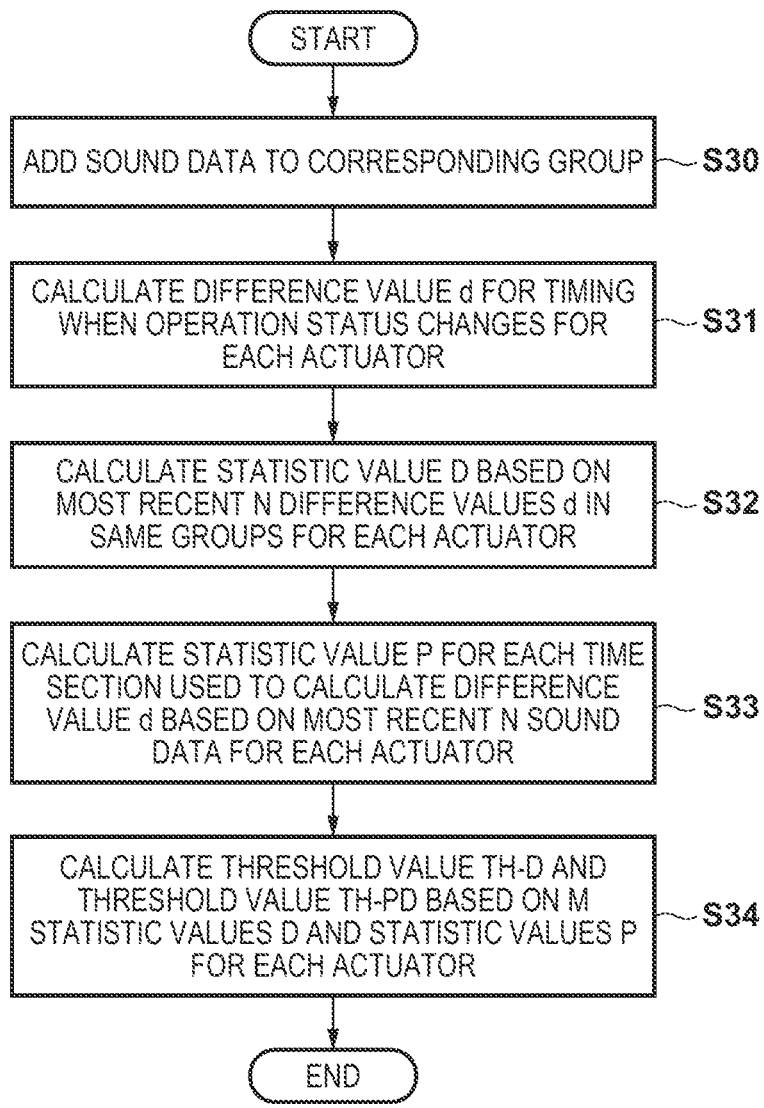
FIG. 11 is a flowchart of a threshold value setting process according to an embodiment.

Next, a second embodiment will be explained mainly on differences from the first embodiment. FIG. 11 is a flowchart of a threshold value setting process according to the present embodiment. Upon acquiring sound data from the image forming apparatus PR, the classification unit 3010 determines, at S30, a group to which the sound data belongs, similarly to S10 of the first embodiment, and stores the sound data in the storage apparatus 302 in association with the group to which the sound data belongs. Additionally, at this time, the classification unit 3010 determines, at S31 for each actuator, a timing when the operation status changes, calculates a difference value d of the actuator based on the sound wave level L in one or more time sections before and after the timing, and stores the difference value d in the storage apparatus 302.

In the case of the sound data illustrated in FIG. 12, for example, from the time section #3 to the time section #4, the feeding motor 91 has changed from an active state to an inactive state. From the time section #14 to the time section #15, the intermediate transfer member motor 92 has changed from an active state to an inactive state. From the time section #12 to the time section #13, the photoconductor motor 93 has changed from an active state to an inactive state. From the time section #12 to the time section #13, the developing motor 94 has changed from an active state to an inactive state. From the time section #10 to the time section #11, the fixing motor 95 has changed from an active state to an inactive state. From the time section #8 to the time section #9, the solenoid 96 has changed from an active state to an inactive state. In the present embodiment, the difference value d is acquired by subtracting, from the mean of the sound wave levels L in two time sections that are both in an active state before becoming in an inactive state, the mean of the sound wave levels L in two time sections when they become in an inactive state and subsequent two time sections. The shaded part of FIG. 12 indicates time sections used for calculating the difference value d for each actuator.

Although, in the present embodiment, the difference value d is calculated based on two time sections before switching from an active state to an inactive state and two time sections after the switching, the difference value d may be configured to be calculated based on a single time section immediately before switching from an active state to an inactive state and a single time section immediately after the switching. Furthermore, three or more time sections may be used. Additionally, it may also be configured such that the difference value d is also calculated similarly at the timing of switching from an inactive state to an active state.

When N of sound data are newly added to the group, the statistic value calculation unit 3011 calculates, at S32, a statistic value D based on the N difference values d acquired for each actuator. The statistic value D may be a 95 percentile value similarly to the statistic value P in the first embodiment. Subsequently, the statistic value calculation unit 3011 calculates, at S33, the statistic value P for each of the time sections used to calculate the difference value d of each actuator. In the case of FIG. 12, for example, the time sections #2 to #5 and #7 to #16 are used to calculate the difference value d. Therefore, the statistic value P described in the first embodiment is calculated respectively for the time sections #2 to #5 and #7 to #16. In the following description, the time section used for calculating the difference value d of the actuator is denoted as a time section associated with the actuator. In the case of FIG. 12, for example, the time section associated with the fixing motor 95 is the time sections #9 to #12.

When the numbers of the acquired statistic values D and P reach M, the threshold value setting unit 3012 sets, at S34, the threshold value TH-D based on the M statistic values D of each actuator. The method of calculating the threshold value TH-D is similar to that of calculating the threshold value TH-P in the first embodiment. In addition, the threshold value setting unit 3012 sets the threshold value TH-P based on the M statistic values P for each of the time sections for which the statistic values P are calculated. The method of calculating the threshold value TH-P is similar to that of the first embodiment.

Figure 13:
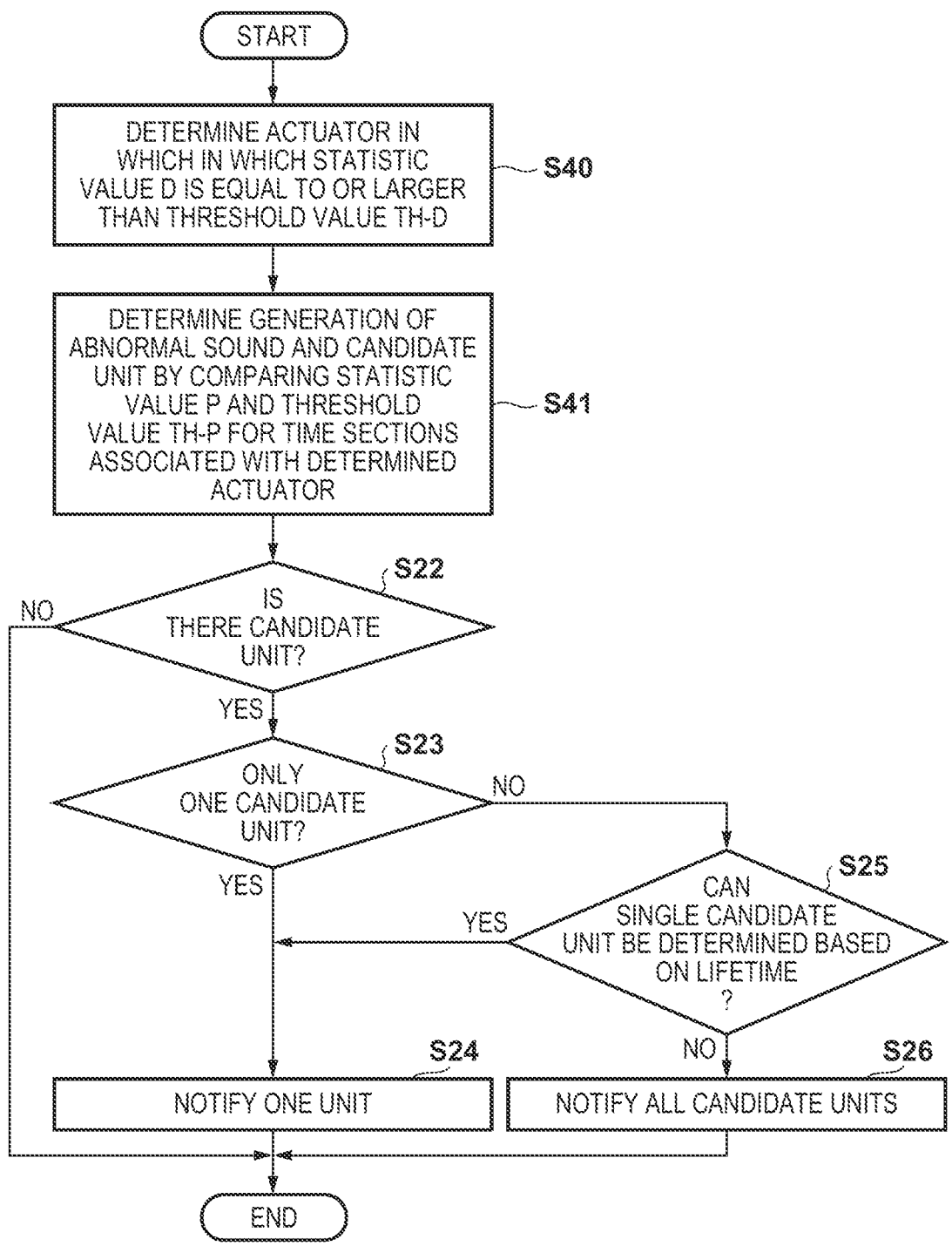
FIG. 13 is a flowchart of a process of determining whether or not an abnormal sound is generated and determining a replacement unit generating the abnormal sound, according to an embodiment.

FIG. 13 is a flowchart of a process of determining whether or not an abnormal sound is generated and determining a replacement unit generating the abnormal sound. The process illustrated in FIG. 13 is executed after the threshold values TH-P and TH-D are set. Here, each time sound data is input from the image forming apparatus PR, the classification unit 3010 groups the sound data, and the statistic value calculation unit 3011 calculates the statistic value D and the statistic value P each time N sound data are added to the group. The process illustrated in FIG. 13 is executed when the statistic value calculation unit 3011 newly calculates the statistic value P and the statistic value D. Noted that, similarly to the first embodiment, the statistic values D and P in the process illustrated in FIG. 13 are based on the sound data acquired by the server SV after the threshold values TH-D and TH-P are set. Therefore, the statistic values D and P in the process illustrated in FIG. 13 may also be referred as a "comparison value D" and a "comparison value P" when distinguishing them from the statistic values D and P used for calculating the threshold values TH-D and TH-P.

At S40, the determination unit 3013 compares the newly calculated statistic value D of the actuator with the threshold value TH-D of the actuator. The determination unit 3013 then determines an actuator whose statistic value D is equal to or larger than the threshold value TH-D. The determination unit 3013 compares, at S41 for each of the actuators whose statistic value D is equal to or larger than the threshold value TH-D, the statistic value P and the threshold value TH-P in the time section associated with the actuator.

For example, assuming that the statistic value D of the fixing motor 95 among the actuators illustrated in FIG. 12 is equal to or larger than the threshold value TH-D of the fixing motor 95, and the respective statistic values D of the other actuators are less than the corresponding threshold values TH-D. In this case, the determination unit 3013 compares, at S41, the statistic value P with the threshold value TH-P for each of the time sections #9 to #12 associated with the fixing motor 95. When the statistic value P is equal to or larger than the threshold value TH-P in the time sections #9 and #10 in which the fixing motor 95 is in an active state, the determination unit 3013 determines that the abnormal sound is generated. Furthermore, the determination unit 3013 determines whether or not the statistic value P is less than the threshold value TH-P in the time sections #11 and #12 in which the fixing motor 95 is in an inactive state. In other words, it is determined whether or not the abnormal sound stops when the fixing motor 95 becomes in an inactive state. In a case where an abnormal sound is generated when the fixing motor 95 is in an active state, and the abnormal sound stops when the fixing motor 95 becomes in an inactive state, the determination unit 3013 determines that the fixing unit 30 driven by the fixing motor 95 is a candidate unit. Subsequently, the determination unit 3013 performs the processing from S22 to S26, similarly to the first embodiment. Here, it may be configured such that notification is made about, at S24, only the generation of the abnormal sound when the abnormal sound is still generated even when the fixing motor 95 became in an inactive state.

The present embodiment calculates, for each actuator, the statistic value D based on the difference between the sound wave levels L before and after the change of the state of the actuator, and sets the threshold value TH-D to be larger than the statistic value D. Subsequently, when the statistic value D is newly calculated for each actuator, the statistic value D is compared with the threshold value TH-D firstly to narrow down the actuators that may be related to generation of an abnormal sound. Generation of an abnormal sound is then determined by comparing the statistic value P with the threshold value TH-P for the time section associated with the actuator, similarly to the method of the first embodiment. Here, in a case where an abnormal sound is generated when the actuator is in an active state and no abnormal sound is generated when the actuator is in an inactive state, the replacement unit associated with the actuator is determined to be a candidate unit that may be generating the abnormal sound. The aforementioned configuration allows for determining whether or not an abnormal sound is generated, and determining a candidate unit that may be generating the abnormal sound, even when the abnormal sound is an unknown sound.

Here, the process illustrated in FIG. 13 narrows down the actuators at S40, and determines generation of an abnormal sound and a candidate unit at S41. However, it may also be configured such that, when there exists an actuator whose statistic value D is equal to or larger than threshold value TH-D at S40, an abnormal sound is determined to be generated, and the unit related to the actuator is determined as a candidate unit. In this case, the processing at S41 is skipped.

In addition, the process illustrated in FIG. 13, the statistic values (comparison values) D and P for the time section based on the newly acquired sound data are calculated in the methods similar to those for the statistic values D and P used for calculating the threshold values TH-D and TH-P. However, it may be configured such that the comparison values D and P are calculated by a different method from that for the statistic values D and P, similarly to the first embodiment. The comparison value P can be calculated as has been described in the first embodiment, for example. In addition, it is possible to use a different, for example, a smaller number of sound data for calculating the comparison value D compared to the number N of sound data used for calculating the statistic value D which is a base for the threshold value TH-D. Furthermore, the comparison value D may be the mean instead of the percentile value of a plurality of difference values d. Moreover, the comparison value D may be the difference value d calculated from single sound data. In this case, the server SV, upon acquiring single sound data from the image forming apparatus PR, executes the process illustrated in FIG. 13.

<Additional Notes>

In each of the aforementioned embodiments, the classification unit 3010 classifies and groups single sound data based on the difference of operation status of a plurality of actuators for each of a plurality of time sections of the single sound data. However, it may also be configured such that sound data is classified and grouped based on the difference of operation status of each time section of a single actuator. When, for example, the grouping is performed based only on the operation status of the feeding motor 91, the sound data illustrated in FIG. 6A and the sound data illustrated in FIG. 6B are grouped in a same group. Alternatively, when the grouping is performed based only on the operation status of the solenoid 96, the sound data illustrated in FIG. 6A and the sound data illustrated in FIG. 6B are grouped in different groups. Therefore, the present invention may employ a configuration in which single sound data is classified and grouped based on the difference of the operation status of one or more actuators for each of a plurality of time sections of the single sound data.

Additionally, in each of the aforementioned embodiments, the classification unit 3010 groups the sound data in a plurality of groups based on the operation status of the actuator. The threshold value setting unit 3012 then sets the threshold value for each of the plurality of time sections of each of the plurality of groups. Furthermore, the determination unit 3013 determines whether or not an abnormal sound is generated by calculating a comparison value for each of the plurality of time sections for each of the plurality of groups, and comparing the comparison value for each of the plurality of time sections with the threshold value of the corresponding time section of the same group. However, it may also be configured such that the threshold value setting unit 3012 sets a threshold value for each of a plurality of time sections for a group among a plurality of groups, and the determination unit 3013 determines whether or not an abnormal sound is generated by calculating a comparison value based on sound data of the group for which the threshold is set.

It may also be configured such that the process described to be executed by the server SV is executed by the engine control unit 87 of the image forming apparatus PR. Furthermore, it may also be configured such that a part of the process to be executed by the received sound processing unit 70, for example, the process to be performed by the reference value setting unit 734 and subsequent functional blocks, i.e., the sound data generation process is executed by the server SV. In this case, the image forming apparatus PR transmits the digital signal output from the AD conversion unit 733 to the server SV together with information indicating the operation status of each actuator.

In addition, the sound diagnosis system according to each of the aforementioned embodiments determines whether or not an abnormal sound is generated in the image forming apparatus PR. However, the sound diagnosis system according to the present invention is not limited to the system that determines whether or not an abnormal sound is generated in the image forming apparatus PR. Specifically, the sound diagnosis system according to the present invention can determine whether or not an abnormal sound is generated in an apparatus including one or more actuators.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-042776, filed Mar. 17, 2022, which is hereby incorporated by reference herein in its entirety.

What is claimed is:

1. A sound diagnosis system comprising:
a microphone configured to receive a sound wave in an apparatus including one or more actuators; and
one or more processors configured to:
process a signal indicating the sound wave in a predetermined period received by the microphone, and generate sound data indicating a sound wave level in each of a plurality of time sections and an operation status of the one or more actuators in each of the plurality of time sections, each of the plurality of time sections being a division of the predetermined period;
classify the sound data into a plurality of groups including a first group based on a difference of operation status of the one or more actuators in each of the plurality of time sections of the sound data;
generate a threshold value for each of the plurality of time sections, the threshold value being calculated using a sound wave level in each of the plurality of time sections of a plurality of first sound data classified in the first group;
calculate a comparison value for each of the plurality of time sections based on the sound wave level in each of the plurality of time sections of one or more second sound data classified in the first group; and
determine whether or not the comparison value for each of the plurality of time sections is greater than the threshold value of a corresponding time section of the first group.

2. The sound diagnosis system according to claim 1, wherein the one or more processors are further configured to determine that an abnormal sound is generated in a time section where the comparison value is greater than the threshold value.

3. The sound diagnosis system according to claim 2, wherein the one or more processors are further configured to determine among the one or more actuators, based on the operation status of the one or more actuators associated with the sound data classified in the first group, a first actuator that has operated in a time section in which the abnormal sound is determined to be generated and has not operated in a time section in which the abnormal sound is not determined to be generated, and determine a unit of the apparatus generating the abnormal sound based on the first actuator.

4. The sound diagnosis system according to claim 3, where wherein the one or more processors are further configured to:
manage a remaining lifetime of each unit of the apparatus, and
when a plurality of units are determined based on the first actuator, determine a unit of the apparatus generating the abnormal sound, based on a remaining lifetime of each of the plurality of units.

5. The sound diagnosis system according to claim 1, wherein the one or more second sound data are sound data generated after the plurality of first sound data.

6. The sound diagnosis system according to claim 1, wherein the one or more second sound data are a plurality of second sound data, and the comparison value, the first comparison value, or the second comparison value are percentile values of a sound wave level in each time section of the plurality of second sound data.

7. The sound diagnosis system according to claim 1, wherein the one or more processors are further configured to:
apply a filter to a signal indicating a sound wave received by the microphone in the predetermined period to generate the sound data, and
classify the sound data further based on the type of the filter applied for generating the sound data.

8. The sound diagnosis system according to claim 1, wherein the apparatus is an image forming apparatus configured to form an image on a sheet being conveyed,
the predetermined period includes a period in which the image forming apparatus is operating to form an image on a sheet, and
the one or more processors are further configured to classify the sound data further based on the type of the sheet.

9. The sound diagnosis system according to claim 8, wherein the predetermined period includes, within a period in which the image forming apparatus is operating to form an image on one or more sheets, a period from a timing when a last sheet of the one or more sheets reaches a predetermined position of the image forming apparatus to a timing when the one or more actuators stop operation.

10. The sound diagnosis system according to claim 8, wherein the microphone is provided in the image forming apparatus, sound data is generated in the image forming apparatus, and the determination of whether or not the comparison value is greater than the threshold value is performed in an information processing apparatus configured to communicate with the image forming apparatus.

11. The sound diagnosis system according to claim 8, wherein the microphone is provided in the image forming apparatus, the sound data is generated in an information processing apparatus configured to communicate with the image forming apparatus, and the determination of whether or not the comparison value is greater than the threshold value is performed in the information processing apparatus.

12. The sound diagnosis system according to claim 8, wherein the microphone is provided in the image forming apparatus, sound data is generated in the image forming apparatus, and the determination of whether or not the comparison value is greater than the threshold value is performed in the image forming apparatus.

13. The sound diagnosis system according to claim 1, wherein:
the comparison value is a first comparison value,
the threshold value is a first threshold value,
the plurality of groups include a second group, and
the one or more processors are further configured to:
generate a second threshold value for each of the plurality of time sections by calculating using a sound wave level in each of the plurality of time sections of a plurality of third sound data classified in the second group;
calculate a second comparison value for each of the plurality of time sections based on a sound wave level in each of the plurality of time sections of one or more fourth sound data classified in the second group; and
determine whether or not the second comparison value for each of the plurality of time sections is greater than the second threshold value of a corresponding time section of the second group.

14. A sound diagnosis system comprising:
a microphone configured to receive a sound wave in an apparatus including one or more actuators; and
one or more processors configured to:
  process a signal indicating the sound wave in a predetermined period received by the microphone, and generate sound data indicating a sound wave level in each of a plurality of time sections and an operation status of the one or more actuators in each of the plurality of time sections, each of the plurality of time sections being a division of the predetermined period;
  classify the sound data into a plurality of groups including a first group based on a difference of the operation status of the one or more actuators in each of the plurality of time sections of the sound data;
  for each actuator of the one or more actuators, generate a first threshold value for an actuator based on a difference between a sound wave level in one or more first time sections associated with the actuator, in which the actuator is operating, of a plurality of first sound data classified in the first group and a sound wave level in one or more second time sections associated with the actuator, in which the actuator is not operating, of the plurality of first sound data classified in the first group;
  calculate a comparison value for the actuator based on a difference between a sound wave level in the one or more first time sections associated with the actuator of one or more second sound data classified in the first group and a sound wave level in the one or more second time sections associated with the actuator of the one or more second sound data classified in the first group; and
  determine, for each actuator of the one or more actuators, whether or not the comparison value for each of the one or more actuators is greater than the first threshold value for a corresponding actuator.

15. The sound diagnosis system according to claim 14, wherein the one or more processors are further configured to determine that an abnormal sound is generated when there exists a first actuator for which the comparison value is greater than the first threshold value.

16. The sound diagnosis system according to claim 14, wherein the one or more processors are further configured to:
  generate a second threshold value for each of the one or more first time sections, the second threshold value being calculated using a sound wave level in each of the one or more first time sections of the plurality of first sound data, and
  when there exists a first actuator for which the comparison value is greater than the first threshold value, calculate a first comparison value for each of the one or more first time sections associated with the first actuator, based on a sound wave level in each of the one or more first time sections associated with the first actuator of the one or more second sound data,
  compare the first comparison value for each of the one or more first time sections associated with the first actuator with the second threshold value of a corresponding first time section, and
  determine that an abnormal sound is generated when the first comparison value for each of the one or more first time sections associated with the first actuator is greater than the second threshold value of the corresponding first time section.

17. The sound diagnosis system according to claim 16, wherein the one or more processors are further configured to:
  generate a third threshold value for each of the one or more second time sections the third threshold value being calculated using a sound wave level in each of the one or more second time sections of the plurality of first sound data, and
  when the first comparison value for each of the one or more first time sections associated with the first actuator is greater than the second threshold value of the corresponding first time section, calculate a second comparison value for each of the one or more second time sections associated with the first actuator, based on a sound wave level in each of the one or more second time sections associated with the first actuator of the one or more second sound data, compare the second comparison value for each of the one or more second time sections associated with the first actuator with the third threshold value of the corresponding second time section, and determine a unit of the apparatus generating the abnormal sound based on the first actuator when the second comparison value for each of the one or more second time sections associated with the first actuator is less than the third threshold value of the corresponding second time section.

18. The sound diagnosis system according to claim 14, wherein, for each actuator of the one or more actuators, the one or more first time sections and the one or more second time sections of the actuator are successive time sections.

19. An information processing apparatus comprising one or more processors configured to:
  acquire sound data indicating a sound wave level in each of a plurality of time sections and an operation status of one or more actuators in each of the plurality of time sections, each of the plurality of time sections being a division of a predetermined period, the sound wave level and the operation status being generated based on a signal indicating a sound wave received in the predetermined period by a microphone in an apparatus including the one or more actuators;
  classify the sound data into a plurality of groups including a first group based on a difference of the operation status of the one or more actuators in each of the plurality of time sections of the sound data;
  generate a threshold value for each of the plurality of time sections, the threshold value being calculated using a sound wave level in each of the plurality of time sections of a plurality of first sound data classified in the first group;
  calculate a comparison value for each of the plurality of time sections based on the sound wave level in each of the plurality of time sections of one or more second sound data classified in the first group; and
  determine whether or not the comparison value for each of the plurality of time sections is greater than the threshold value of a corresponding time section of the first group.

20. An information processing apparatus comprising one or more processors configured to:
  acquire sound data indicating a sound wave level in each of a plurality of time sections and an operation status of one or more actuators in each of the plurality of time sections, each of the plurality of time sections being a division of a predetermined period, the sound wave level and the operation status being generated based on a signal indicating a sound wave received in the predetermined period by a microphone in an apparatus including the one or more actuators;

classify the sound data into a plurality of groups including a first group based on a difference of the operation status of the one or more actuators in each of the plurality of time sections of the sound data;

for each actuator of the one or more actuators, generate a first threshold value for an actuator based on a difference between a sound wave level in one or more first time sections associated with the actuator, in which the actuator is operating, of a plurality of first sound data classified in the first group, and a sound wave level in one or more second time sections associated with the actuator, in which the actuator is not operating, of the plurality of first sound data classified in the first group;

calculate a comparison value for the actuator based on a difference between a sound wave level in the one or more first time sections associated with the actuator of one or more second sound data classified in the first group and a sound wave level in the one or more second time sections associated with the actuator of the one or more second sound data classified in the first group; and determine, for each actuator of the one or more actuators, whether or not the comparison value for each of the one or more actuators is greater than the first threshold value for a corresponding actuator.

21. A non-transitory computer-readable storage medium storing a computer program, wherein the computer program, when executed by one or more processors of an apparatus, causes the apparatus to:

acquire sound data indicating a sound wave level in each of a plurality of time sections and an operation status of one or more actuators in each of the plurality of time sections, each of the plurality of time sections being a division of a predetermined period, the sound wave level and the operation status being generated based on a signal indicating a sound wave received in the predetermined period by a microphone in an apparatus including the one or more actuators;

classify the sound data into a plurality of groups including a first group based on a difference of the operation status of the one or more actuators in each of the plurality of time sections of the sound data;

generate a threshold value for each of the plurality of time sections, the threshold value being calculated using a sound wave level in each of the plurality of time sections of a plurality of first sound data classified in the first group; and calculate a comparison value for each of the plurality of time sections based on the sound wave level in each of the plurality of time sections of one or more second sound data classified in the first group; and determine whether or not the comparison value for each of the plurality of time sections is greater than the threshold value of a corresponding time section of the first group.

* * * * *